United States Patent
Yamashita et al.

(10) Patent No.: US 9,435,938 B2
(45) Date of Patent: Sep. 6, 2016

(54) EDGE-LIT SURFACE LIGHT SOURCE DEVICE

(71) Applicant: SHARP KABUSHIKI KAISHA, Osaka-shi, Osaka (JP)

(72) Inventors: Atsushi Yamashita, Osaka (JP); Kohji Sakai, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 51 days.

(21) Appl. No.: 14/430,120

(22) PCT Filed: Sep. 18, 2013

(86) PCT No.: PCT/JP2013/075186
§ 371 (c)(1),
(2) Date: Mar. 20, 2015

(87) PCT Pub. No.: WO2014/046140
PCT Pub. Date: Mar. 27, 2014

(65) Prior Publication Data
US 2015/0226911 A1 Aug. 13, 2015

(30) Foreign Application Priority Data

Sep. 21, 2012 (JP) ................... 2012-208514

(51) Int. Cl.
*G02F 1/1335* (2006.01)
*G09F 13/04* (2006.01)
*F21V 8/00* (2006.01)
*F21K 99/00* (2016.01)

(52) U.S. Cl.
CPC ............... *G02B 6/0068* (2013.01); *F21K 9/56* (2013.01); *G02B 6/0073* (2013.01); *G02B 6/0026* (2013.01)

(58) Field of Classification Search
CPC .............. G02F 1/133615; G02F 1/133603; G02F 1/133604; G02F 2001/133607; G02F 1/133608; G02F 1/133605; G02B 6/0068; G02B 6/0038; G02B 6/0055; G02B 6/0036; G02B 6/0053
USPC ................. 349/65, 61, 62; 362/97.2
See application file for complete search history.

(56) References Cited

U.S. PATENT DOCUMENTS

| | | | |
|---|---|---|---|
| 2009/0034291 A1 | 2/2009 | Nakamura | |
| 2009/0225567 A1* | 9/2009 | Mori | G02F 1/133615 362/612 |
| 2012/0092592 A1* | 4/2012 | Imajo | G02F 1/133603 349/62 |

FOREIGN PATENT DOCUMENTS

| CN | 101526693 A | 9/2009 |
|---|---|---|
| JP | 2008-140548 A | 6/2008 |
| JP | 2010-225842 A | 10/2010 |
| JP | 2011-232607 A | 11/2011 |
| JP | 2011-233419 A | 11/2011 |
| JP | 2012-9793 A | 1/2012 |
| JP | 2012-89341 A | 5/2012 |

* cited by examiner

*Primary Examiner* — Mike Qi
(74) *Attorney, Agent, or Firm* — Birch, Stewart, Kolasch & Birch, LLP (57) ABSTRACT

LED light source substrates (140) in an edge-light type surface light source device are disposed with a light guide plate interposed therebetween. A length of each of the LED light source substrates is shorter than a length of a plane of incidence of the light guide plate. The chromaticity of light from a central part (141) is uniform, and the chromaticity of light from ends (142) is more shifted toward blue than the chromaticity of light from the central part (141).

8 Claims, 9 Drawing Sheets

10: Surface light source device
120: Light guide plate
130: Reflecting sheet
140: LED light source substrate
150: Diffusing sheet
160: Housing

140: LED light source substrate
601: Connector
610: Wiring substrate
620: LED package

FIG. 6

140: LED light source substrate
611: Substrate
612: Wiring layer
613: Solder resist layer
621: LED element
622: Encapsulation resin
623: Bonding wire
624: Wiring layer
625: Substrate
626: Solder

FIG. 7

140: LED light source substrate
141: Central part
142: End
610: Wiring substrate
620: LED package

FIG. 8

140: LED light source substrate
141: Central part
142: End

FIG. 9

140: LED light source substrate
141: Central part
142: End
610: Wiring substrate
620: LED package

FIG. 10

140: LED light source substrate
141: Central part
142: End

FIG. 13

EDGE-LIT SURFACE LIGHT SOURCE DEVICE

CROSS REFERENCE TO RELATED APPLICATIONS

This application is a National Stage of International Application No. PCT/JP2013/075186, filed on Sep. 18, 2013. The contents of which is expressly incorporated herein by reference in its entirety.

TECHNICAL FIELD

The present invention relates to an edge-light type surface light source device including a linear light source and a plate-shaped light guide section on which liner light from the linear light source is incident via a side surface of the light guide section and from which surface light is emitted via at least one plane of the light guide section.

BACKGROUND ART

An edge-light type surface light source device in which a light guide plate is employed has come into widespread use mainly as a backlight for a liquid crystal.

An edge-light type surface light source device has become prevalent in a backlight for a liquid crystal. This is because the edge-light type surface light source device is more effective in thinning (i) a backlight module for a liquid crystal and (ii) a product to which the backlight module is applied, as compared with a direct type backlight. Note that (a), in the direct type backlight, a light source is arranged directly under a liquid crystal panel instead of using a light guide plate, whereas (b), in the edge-light type surface light source device, (i) a linear light source is arranged on an edge of a light guide plate and (ii) the light guide plate converts light into plane emitting light. Furthermore, in some cases, the edge-light type surface light source device is employed also as an illumination.

Conventionally, a cold cathode fluorescent lamp (CCFL) has been prevalent in a light emitting source of such a light source device. Note, however, that the cold cathode fluorescent lamp (CCFL) has been recently replaced with a light emitting diode (LED). This makes it possible to (i) eliminate use of mercury, which (a) is employed in the CCFL and a fluorescent tube and (b) imposes a heavy burden on the environment, (ii) reduce power consumption, (iii) increase color reproducibility, and (iv) prolong a life of the light source device.

In such a structure, there may be a difference in luminance between a part thereof that is weakly irradiated with light from a light source and the rest thereof. Given these circumstances, backlight units have been proposed which make it easy to reduce a difference in luminance of a liquid crystal panel (see Patent Literatures 1 to 3).

CITATION LIST

Patent Literature 1

Japanese Patent Application Publication, Tokukai, No. 2011-233419 A (Publication Date: Nov. 17, 2011)

Patent Literature 2

Japanese Patent Application Publication, Tokukai, No. 2012-89341 A (Publication Date: May 10, 2012)

Patent Literature 3

Japanese Patent Application Publication, Tokukai, No. 2008-140548 A (Publication Date: Jun. 19, 2008)

SUMMARY OF INVENTION

Technical Problem

Generally, shortening a total length of a light source substrate having the linear light source provided on an elongated substrate brings about many advantages. Examples of such advantages encompass (i) a reduction in production cost, (ii) a reduction in product weight, (iii) a reduction in burden on the environment due to a reduction in amount of a material to be used, and (iv) a reduction in a transportation cost due to a reduction in size and weight of a product.

Figure 13:
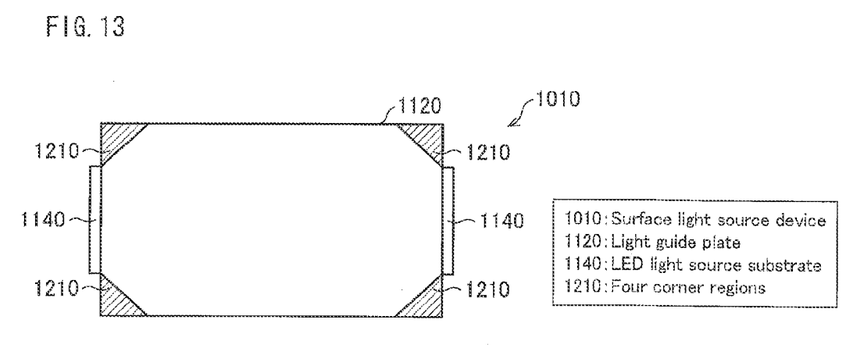
FIG. 13 is a plan view schematically showing a conventional surface light source device.

FIG. 13 is a plan view schematically showing a surface light source device in which the length of the linear light source has been made shorter. In a surface light source device 1010, light source substrates 1140 are provided in central parts of both short sides of a light guide plate 1120.

Each of the light source substrates 1140 emits irradiating light with which the light guide plate 1120 is irradiated. The irradiating light emitted from the LED light source substrate 1140 enters the light guide plate 1120 via a plane of incidence, i.e., a side surface of the light guide plate 1120. The irradiating light, having entered the light guide plate 1120, is mixed and uniformized in the light guide plate 1120 to be turned into surface light that exits the light guide plate 1120 via a top surface, i.e., an irradiating surface of the light guide plate 1120.

The light guide plate 1120 includes a light guide body and a reflection pattern. Examples of a material of the light guide body encompass (i) an acrylic resin which has a very high transmittance, (ii) a polycarbonate which has (a) a certain degree of high transmittance and (b) a high strength. Particularly, the acrylic resin is often employed as a material of a surface light source device having a relatively large size. This is because an amount of light, which is absorbed by the light guide body, cannot be ignored. On the other hand, the polycarbonate is often employed as a material of a surface light source device which is in a relatively small size and needs strength.

Optical polymers such as acrylic resin and polycarbonate are required to be low in wavelength dependency of refractive index, but have not been free therefrom yet. For example, acrylic resin, polystyrene, and polycarbonate have higher refractive indices at shorter wavelengths. As a result, the color of light from the light source substrates 1140 shifts toward yellow as the light travels through the light guide plate 1120.

The surface light source device 1010 shown in FIG. 13 has four corner regions 1210, two of which are provided on a short side of the light guide plate 1120 on which one of the light source substrates 1140 is provided and the other two of which are provided on the opposite short side on which the other of the light source substrates 1140 is provided. The two of the four corner regions 1210 are not directly irradiated with light from the one of the light source substrates 1140, but are directly irradiated with light from the other of the light source substrates 1140, thus emitting light whose color has shifted toward yellow. Meanwhile, a region other than the four corner regions 1210 is directly irradiated with light from the two light source substrates 1140, thus emitting light free or almost free of such a shift.

As a result, at a boundary between each of the four corner regions 1210 and the main-part region, a difference in color of light occurs and is seen as color unevenness. Especially in a case where a large-sized light guide plate 1120 is used, the distance between the light source substrate 1140 provided on one short side and those of the four corner regions 1210 which are adjacent to the other short side is long. This results in a more conspicuous difference in color of light.

The present invention has been made in view of the problems described above, and it is an object of the present invention to provide an edge-light type surface light source device and the like that make inconspicuous a difference in color that occurs at a boundary between a main part of a surface light emission region and a corner of the region.

Solution to Problem

In order to solve the problems described above, an edge-light type surface light source device according to one aspect of the present invention includes: linear light sources; and a light guide section for emitting surface light when linear light from the linear light sources is incident on the light guide section, the linear light sources being disposed with the light guide section interposed therebetween, each of the linear light sources being shorter in length than a plane of incidence of the light guide section, the linear light sources being configured such that the liner light has nonuniform chromaticity.

Advantageous Effects of Invention

According to one aspect of the present invention, the light guide section is irradiated with linear light having nonuniform chromaticity from the linear light sources, surface light having nonuniform chromaticity is emitted from the light guide section. This brings about an effect of making less conspicuous a difference in color of emitted light that occurs a boundary between a main part of the light guide section and a corner of the light guide section.

DESCRIPTION OF EMBODIMENTS

Embodiments of the present invention are described below with reference to the drawings. Members having the same functions as those of members described earlier are given the same reference signs, and as such, are omitted as appropriate from the description.

Embodiment 1

First, an embodiment of the present invention is described below with reference to FIGS. 1 through 7. A surface light source device of the present embodiment is used a backlight for a liquid crystal display panel in a liquid crystal display device.

(Configuration of a Surface Light Source Device)

Figure 2:
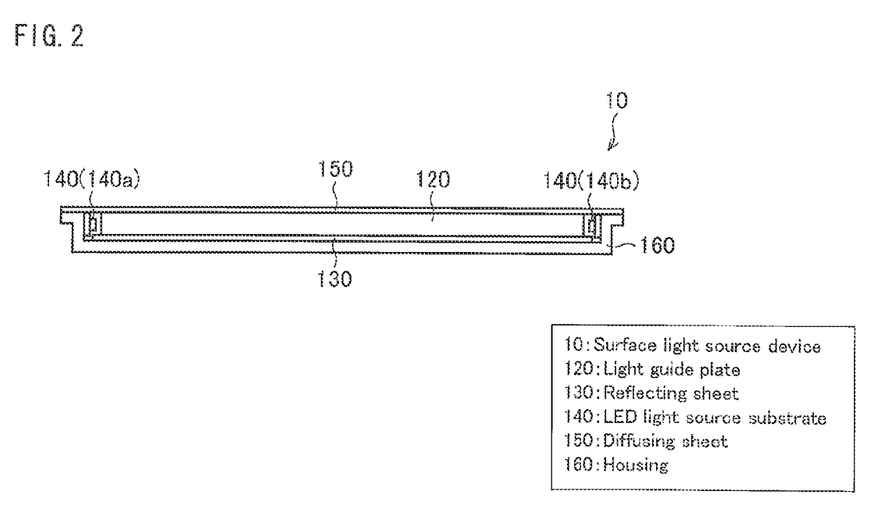
FIG. 2 is a front cross-sectional view of the surface light source device.
Figure 3:
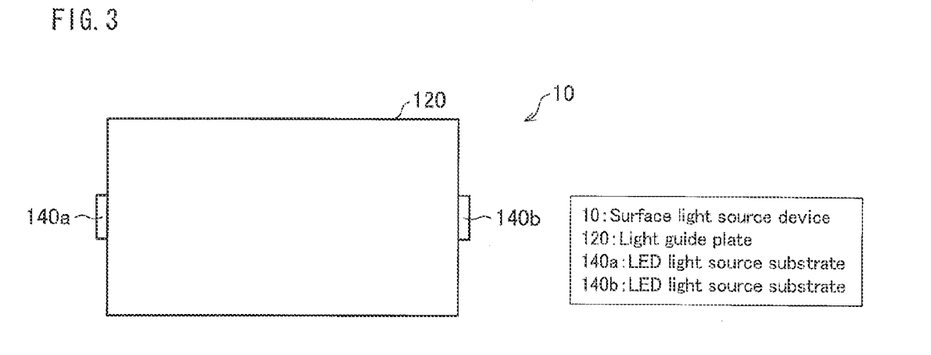
FIG. 3 is a plan view showing a configuration of a part of the surface light source device.

FIG. 2 is a front cross-sectional view of a surface light source device according to the present embodiment. FIG. 3 is a plan view showing a configuration of a part of the surface light source device.

As shown in FIG. 2, a surface light source device 10 of the present embodiment is an edge-light type surface light source device, and includes a housing 160, a light guide plate (light guide section) 120, a reflecting sheet 130, a diffusing sheet 150, and two LED light source substrates (linear light sources) 140*a* and 140*b*. When individually referred to, the LED light source substrates are given the reference signs 140*a* and 140*b*, etc. When collectively referred to, the LED light source substrates are given the reference sign 140.

Each of the light source substrates 140 emits irradiating light with which the light guide plate 120 is irradiated. The irradiating light emitted from the LED light source substrate 140 enters the light guide plate 120 via a plane of incidence, i.e., a side surface of the light guide plate 120. The irradiating light, having entered the light guide plate 120 via the plane of incidence, is mixed and uniformized in the light guide plate 120 to be turned into surface light that exits the light guide plate 120 via a top surface (irradiating surface) of the light guide plate 120.

The reflecting sheet 130 is provided on a lower surface side of the light guide plate 120 (opposite to the irradiating surface), and serves to reflect light having leaked through the lower surface side and return it into the light guide plate 120. The reflecting sheet 130 contributes to an improvement in efficiency in the use of light.

The diffusing sheet 150 is provided on an upper surface side of the light guide plate 120 (i.e. on the irradiating surface), and serves to uniformize the light emitted toward the upper surface side and thereby reduce luminance unevenness. The diffusing sheet 150 is used in combination with other various optical sheets (e.g., a lens sheet, a polarized reflection sheet, etc.) as needed.

The housing 160 serves to house, fix, and support the light guide plate 120, the reflecting sheet 130, and the diffusing sheet 150, and the LED light source substrates 140.

The light guide plate 120 has a horizontally long rectangular shape in conformity to the shape of a liquid crystal panel that is mounted in a display device together with the light guide plate 120. The light guide plate 120 may be called a "light guide sheet" when the light guide plate 120 used is of a comparatively thin type. However, there is no strict distinction between them, and they are expressions idiomatically used for different purposes. The member referred to as "light guide plate 120" here is a light guide section in general encompassing what is called a light guide sheet.

In the surface light source device 10 of the present embodiment, as shown in FIGS. 2 and 3, the LED light source substrates 140*a* and 140*b* are provided on the central parts of a pair short sides 121*a* and 121*b* of the light guide plate 120, respectively. That is, the lengths of light-emitting portions of the LED light source substrates 140*a* and 140*b* are shorter than the lengths of the short sides (planes of incidence) of the light guide plate 120. This is because the arrangement of the LED light source substrates 140*a* and 140*b* as described above makes it possible to achieve a sufficient range of irradiation in the light guide plate 120 without needing to further lengthen the lengths of the light-emitting portions of the LED light source substrates 140*a* and 140*b*. This configuration makes it possible to reduce the area of each of the LED light source substrates 140*a* and 140*b* and reduce the number of LEDs to be mounted, thus making it possible to reduce manufacturing cost.

(Range of Irradiation with Light)

Figure 4:
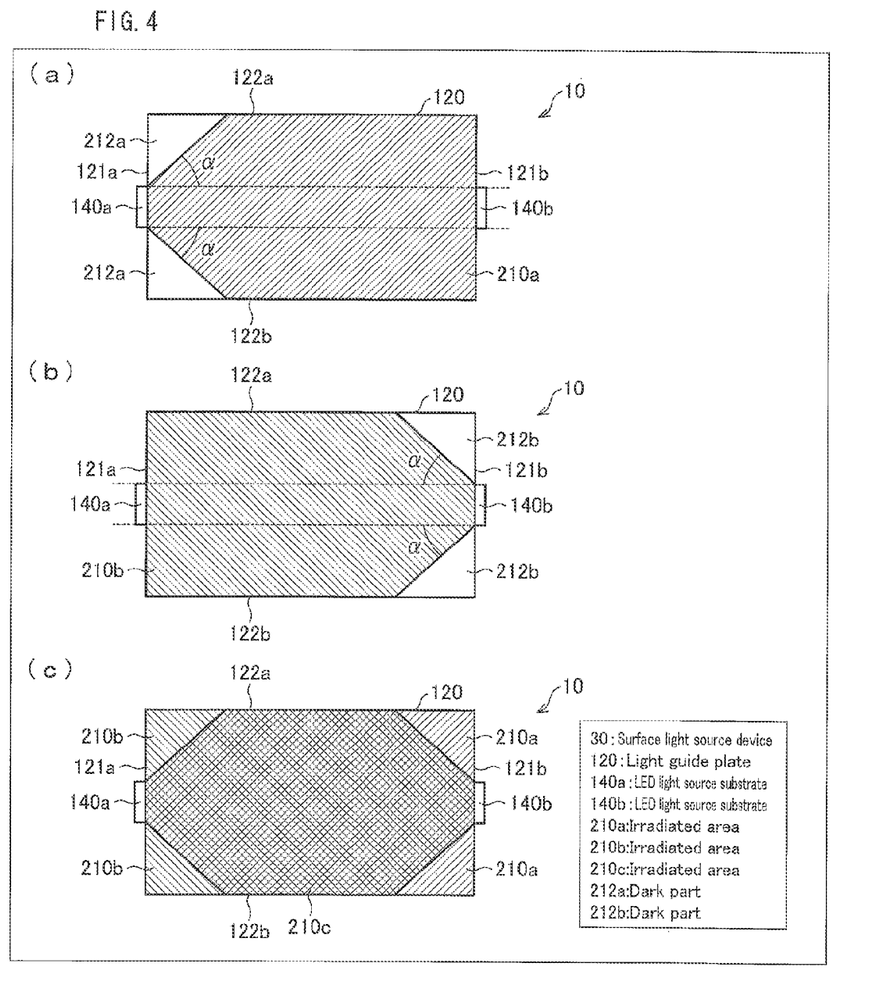
FIG. 4 is a plan view showing a range of irradiation with light from each of such LED light source substrates.

FIG. 4 is a plan view showing a range of irradiation with light from each of the LED light source substrates 140*a* and 140*b* in the surface light source device 10 according to the present embodiment. (a) of FIG. 4 shows a range of irradiation 210*a* with light from the LED light source substrate 140*a*. (b) of FIG. 4 shows a range of irradiation 210*b* with light from the LED light source substrate 140*b*. (c) of FIG. 4 shows a range of irradiation with light from both of the LED light source substrates 140*a* and 140*b*.

As shown in (a) of FIG. 4, light emitted from the LED light source substrate 140*a* travels toward the short side 121*b* of the light guide plate 120. The range of irradiation 210*a* with light has a divergence at an angle of refraction a toward a long side 122*a* of the light guide 120 and a divergence at the angle of refraction a toward a long side 122*b* of the light guide 120. This is because the light emitted from the LED light source substrate 140*a* is refracted at a side face (i.e. a boundary surface) of the short side 121*a* of the light guide plate 120. With this, a dark part 212*a* that is not irradiated with the light from the LED light source substrate 140*a* (i.e. an unhatched portion) is formed at each of the two corners on the short side 121*a* of the light guide plate 120.

It should be noted here that the refractive index A of the light guide plate 120 is higher. For this reason, the angle of refraction a formed by a line normal to the boundary surface and a line of refraction is smaller than 90°. A relationship between the refractive index A and the angle of refraction a can be expressed by Expression (1):

$$\sin \alpha = 1/\lambda \qquad (1)$$

Further, as shown in (b) of FIG. 4, light emitted from the LED light source substrate 140*b* travels toward the short side 121*a* of the light guide plate 120. The range of irradiation 210*b* with light has a divergence at the angle of refraction a toward the long side 122*a* of the light guide 120 and a divergence at the angle of refraction a toward the long side 122*b* of the light guide 120. With this, a dark part 212*b* that is not irradiated with the light from the LED light source substrate 140*b* (i.e. an unhatched portion) is formed at each of the two corners on the short side 121*b* of the light guide plate 120.

(c) of FIG. 4 shows a combination of the range of 210*a* irradiation with light from the LED light source substrate 140*a* and the range of irradiation 210*b* with light from the LED light source substrate 140*b*. In (c) of FIG. 4, the range of irradiation 210*c* is a region where the range of 210*a* irradiation and the range of irradiation 210*b* overlap each other.

In a state where the LED light source substrates 140*a* and 140*b* are both turned on, as shown in (c) of FIG. 4, the dart part 212*a* (see (a) of FIG. 4) of the light guide plate 120 is eliminated by the range of irradiation 210*b* shown in (b) of FIG. 4, and the dart part 212*b* (see (b) of FIG. 4) of the light guide plate 120 is eliminated by the range of irradiation 210*a* shown in (a) of FIG. 4. With this, the entire region of the light guide plate 120 falls within a range of irradiation.

That is, while the surface light source device 10 of the present embodiment uses the LED light source substrates 140*a* and 140*b* whose light-emitting portions are short in length, the ingenious arrangement of the LED light source substrates 140*a* and 140*b* as described above makes it possible to achieve a sufficient range of irradiation in the light guide plate 120. This as a result makes it possible to emit light from the entire region of the light guide plate 120.

(Details of the LED Light Source Substrates)

The optical polymer, such as acrylic resin or polycarbonate, of which the light guide plate 120 is made has wavelength dependency of refractive index, i.e. has higher refractive indices at shorter wavelength. As a result, the color of light from the light source substrates 140 shifts toward yellow as the light travels through the light guide plate 120. For this reason, as shown in FIG. 13, at a boundary between each of the corners and the main part of the light guide plate 1120, a difference in color of light occurs and is seen as color unevenness.

Figure 1:
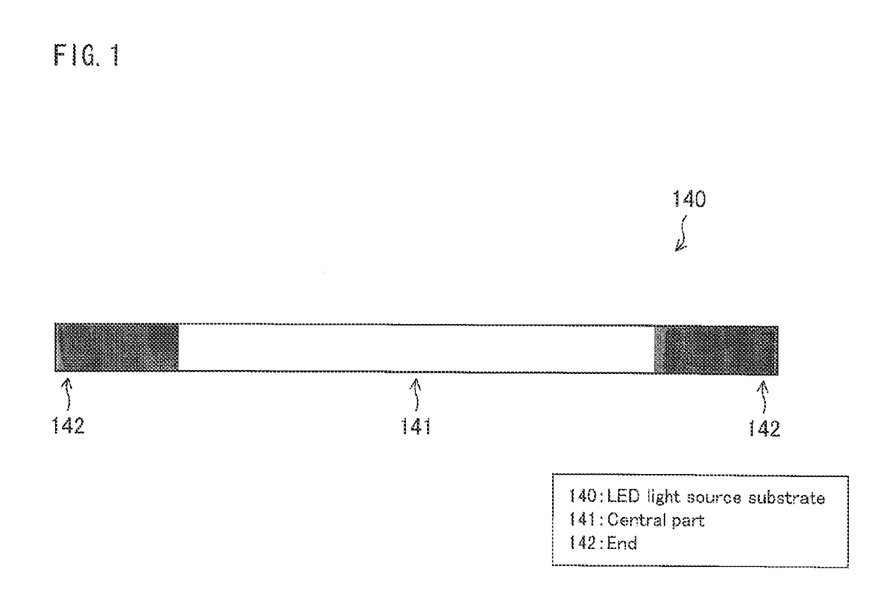
FIG. 1 is a side view showing light emitted from an LED light source substrate in a surface light source device according to an embodiment of the present invention.

FIG. 1 is a side view showing light emitted from an LED light source substrate 140 in the present embodiment. In FIG. 1, the gray portions indicate light whose color has shifted toward blue. In the LED light source substrate 140 of the present embodiment, as shown in FIG. 1, light from a central part 141 is white light having uniform chromaticity, whereas light from both ends 142 is light (blue-shift light) whose color has shifted toward blue in comparison with the white light from the central part 141.

Irradiation of a side face of the light guide plate 120 with the light (shown in FIG. 1) from the LED light source substrate 140 causes more of the light emitted from the main part of the light guide plate 120 to be from the central parts of the two LED light source substrates 140*a* and 140*b*, and causes less of the light to be from the other parts. Therefore, white light having uniform chromaticity is emitted from the main part of the light guide plate 120.

Meanwhile, light emitted from the two corners 210*a* of the light guide plate 120 is light from the LED light source substrate 140*a*, which, of the two LED light source substrates 140*a* and 140*b*, is farther from the corners 210*a*. Therefore, more of the light emitted from each of the corners 210*a* is from each of the ends of the LED light source substrate 140*a*, and less of the light is from the other parts. It should be noted here that the light from each of the ends of the LED light source substrate 140*a* is the blue-shift light, and while the light travels through the light guide plate 120, a short-wavelength component such as blue is more absorbed than a long-wavelength component such as red. As a result, the light emitted from the two corners 210*a* has its blue shift canceled out and becomes white light similar to that emitted from the central part.

Similarly, light emitted from the two corners 210b of the light guide plate 120 is light from the LED light source substrate 140b, which, of the two LED light source substrates 140a and 140b, is farther from the corners 210b. Therefore, more of the light emitted from each of the corners 210b is from each of the ends of the LED light source substrate 140b, and less of the light is from the other parts. The light each of the ends of the LED light source substrate 140b here is the blue-shift light. Therefore, as described above, the light emitted from the two corners 210b has its blue shift canceled out and becomes white light similar to that emitted from the central part.

Therefore, white light is emitted from the main part and the corners 210a and 210b of the light guide plate 120, and a difference in color of the emitted light that occurs at boundaries between the main part and the corners 210a and 210b of the light guide plate 120 is reduced, so that the difference in color becomes inconspicuous. In particular, according to the configuration of the surface light source device 10 of the present embodiment, a vertically and horizontally symmetrical pattern of irradiation whose appearance is natural to a viewer can be formed on the light guide plate 120.

(Example of LED Light Source Substrate)

Figure 5:
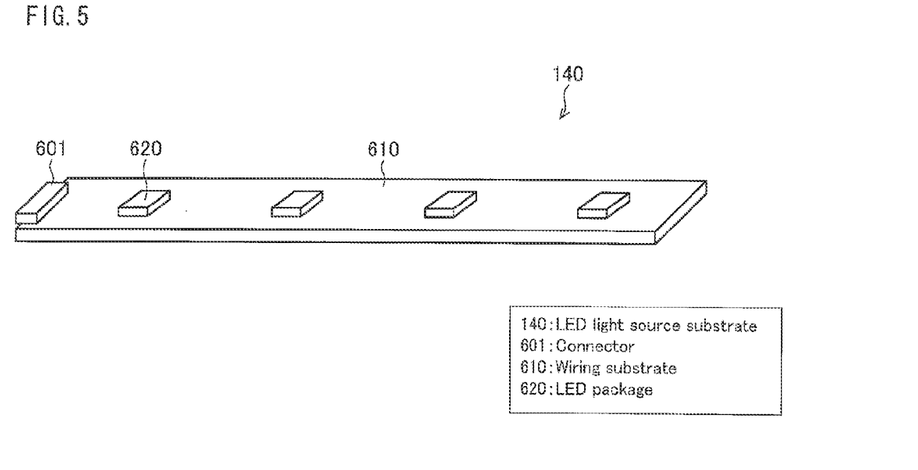
FIG. 5 is a perspective view showing the appearance of an LED light source substrate of the present example.
Figure 6:
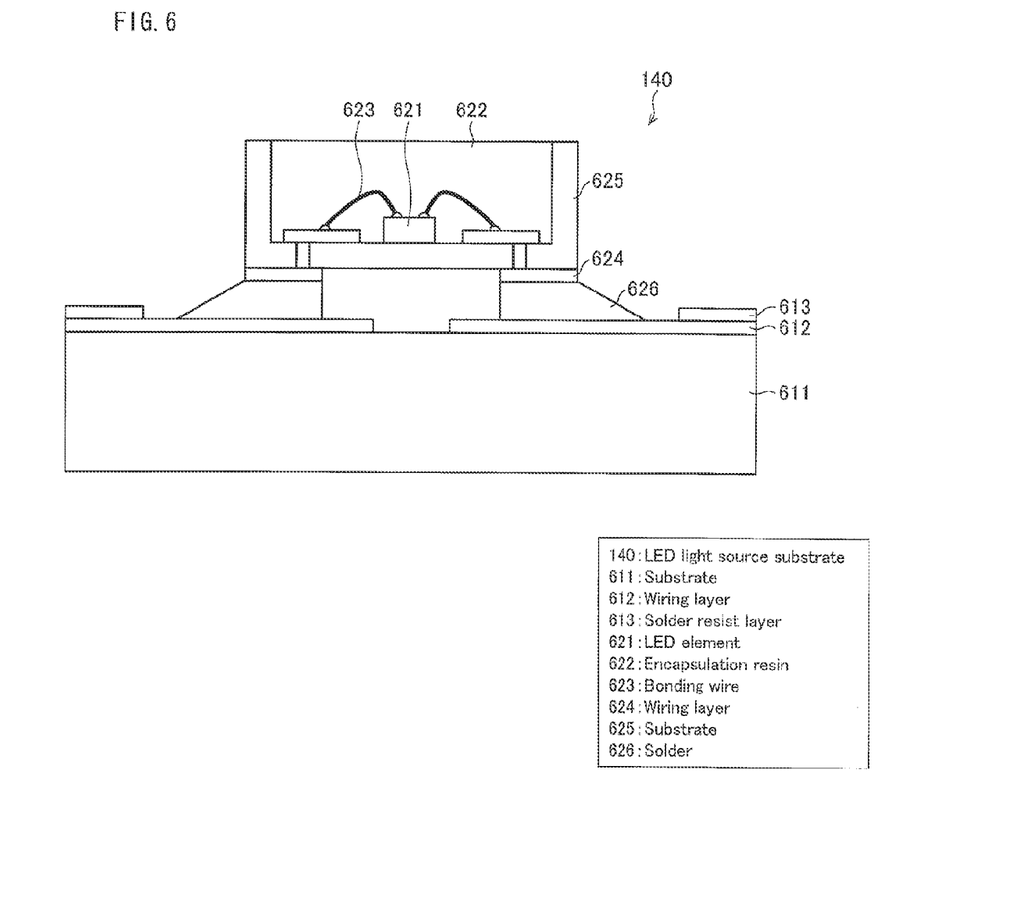
FIG. 6 is a cross-sectional view showing in detail an LED package on the LED light source substrate.

Next, a specific example of an LED light source substrate 140 of the present embodiment is described with reference to FIGS. 5 through 7. FIG. 5 is a perspective view showing the appearance of an LED light source substrate 140 of the present example. FIG. 6 is a cross-sectional view showing in detail an LED package 620 (point light source) on the LED light source substrate 140.

As shown in FIG. 5, the LED light source substrate 140 includes a wiring substrate 610, a plurality of LED packages 620, and a connector 601. The wiring substrate 610 is in the shape of a long narrow plate, and the plurality of LED packages 620 and the connector 601 are mounted on the wiring substrate 610 in such a manner as to be arranged along a long side of the wiring substrate 610. The LED packages 620 are electrically connected to an external device (not illustrated) via a harness (not illustrated). This allows external light emission control.

A structure of each of the LED packages 620 and an area therearound is described in more detail with reference to FIG. 6.

The wiring substrate 610 is constituted by joining a substrate 611, a wiring layer 612, and a solder resist layer 613 on top of each other. The LED package 620 is connected and fixed onto the wiring layer 612 with solder 626.

The LED package 620 includes an LED element 621, an encapsulation resin 622, a bonding wire 623, a wiring layer 624, and a substrate 625. The LED element 621 is mounted on the substrate 625, and is connected to the wiring layer 624 via the bonding wire 623. The encapsulation resin 622 encapsulates the interior of the substrate 625 in order to protect the internal components and connections. Further, the encapsulation resin 622 contains a phosphor, thereby making it possible to change the color of light emitted by the LED element 621, e.g., to use a blue LED element and a yellow phosphor to configure the LED package to emit white light. By the wiring layer 624, a site where a connection is made with the solder 626 and a site where the LED element 621 is wire-bonded are wired to each other.

In the example shown in FIG. 6, the wiring layer 624 has such a shape as to penetrate the substrate 625, the solder 626 is connected to a side of the wiring layer 624 that faces in the same direction as a bottom surface of the substrate 625, and the LED element 621 is connected to a side of the wiring layer 624 that faces in the same direction as a top surface of the substrate 625.

With the configuration shown in FIG. 6, the LED element 621 is mechanically fixed, and is electrically connected to the wiring substrate 610, the connector 601, and the harness (not illustrated). This allows external light emission control.

Figure 7:
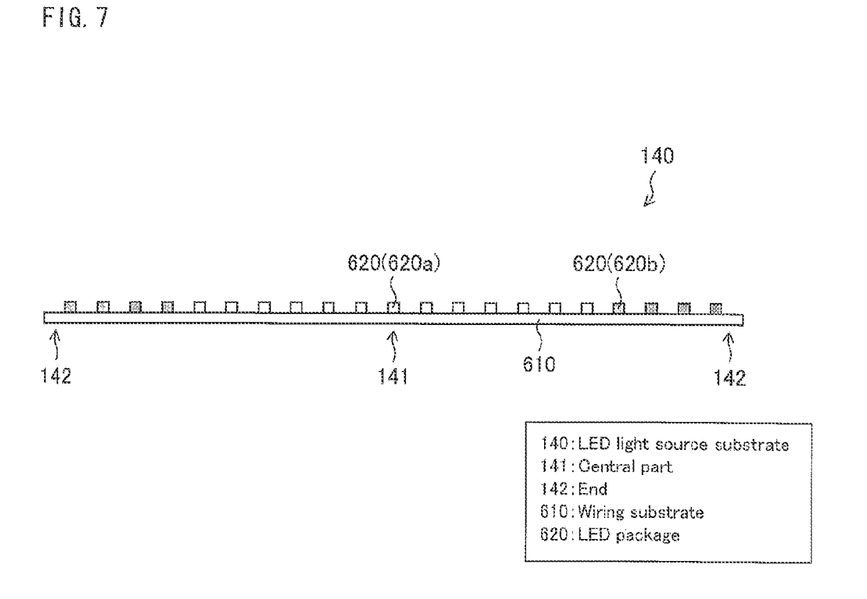
FIG. 7 is a cross-sectional view showing in detail an arrangement of LED packages on the LED light source substrate.

FIG. 7 is a cross-sectional view showing in detail an arrangement of LED packages 620 on the LED light source substrate 140 of the present example. As shown in FIG. 7, LED packages (white light sources) 620a that emit white light are disposed in the central part 141 of the LED light source substrate 140, LED packages (shift light sources) 620b that emit the blue-shift light are disposed in at each of the ends 142 of the LED light source substrate 140. It should be noted that the blue-shift light is achieved by replacing at least either the light emission color (wavelength) of the LED element 621 in each LED package 620b or the phosphor in the encapsulation resin 622 in each LED package 620b with that which is different from that of each LED package 620a.

Embodiment 2

Figure 8:
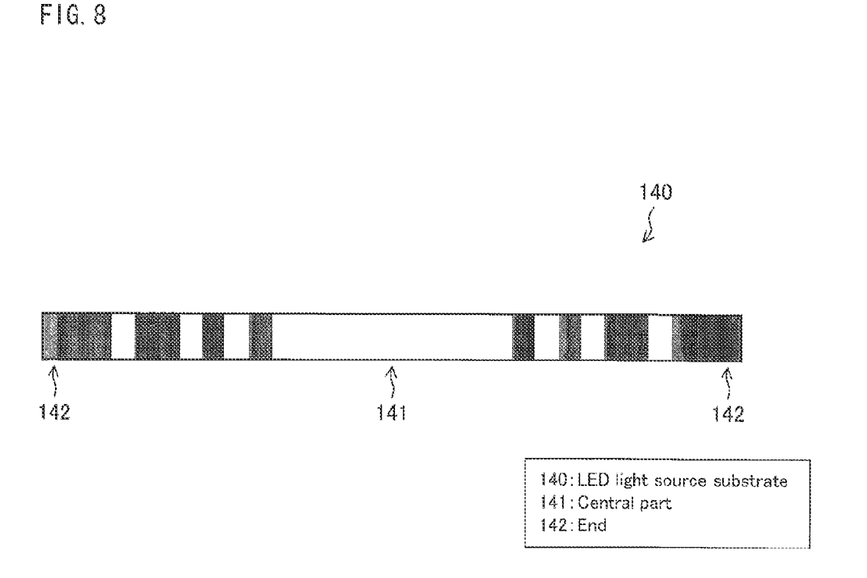
FIG. 8 is a side view showing light emitted from an LED light source substrate in a surface light source device according to another embodiment of the present invention.

Next, another embodiment of the present invention is described with reference to FIGS. 8 and 9. FIG. 8 is a diagram showing light emitted from an LED light source substrate 140 in a surface light source device 10 of the present embodiment. As shown in the drawings, the LED light source substrate 140 of the present embodiment has a plurality of point light sources (not illustrated) arranged linearly, and the point light sources include white light sources that emit white light and shift light sources that emit light obtained by shifting the white light toward blue. In the LED light source substrate 140 of the present embodiment, the proportion of the shift light sources that are arranged becomes higher as the LED light source substrate 140 extends from the central part 141 toward each of the ends 142.

In this case, a difference in color between light from the central part 141 and the blue-shift light from the ends 142 becomes hardly conspicuous. Therefore, a difference in color of light emitted from the light guide plate 120 becomes further inconspicuous.

(Example of LED Light Source Substrate)

Next, a specific example of the LED light source substrate 140 of the present embodiment is described with reference to FIG. 9. In this example, the LED light source substrate 140 shown in FIGS. 5 and 6 is used.

Figure 9:
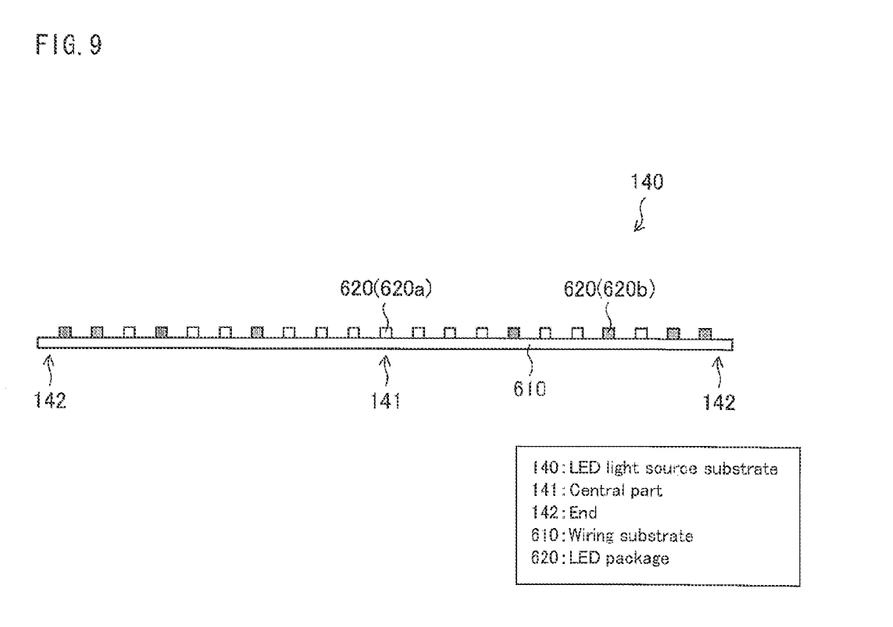
FIG. 9 is a cross-sectional view showing in detail an arrangement of LED packages on an LED light source substrate of the present example.

FIG. 9 is a cross-sectional view showing in detail an arrangement of LED packages 620 on the LED light source substrate 140 of the present example. The LED light source substrate 140 shown in FIG. 9 is different from the LED light source substrate 140 shown in FIG. 7 in terms of the order in which LED packages 620a that emit white light and LED packages 620b that emit the blue-shift light are arranged, and is identical to LED light source substrate 140 shown in FIG. 7 in terms of the other components. That is, in the LED light source substrate 140 shown in FIG. 9, the proportion of the LED packages 620b that are arranged becomes higher as the LED light source substrate 140 extends from the central part 141 toward each of the ends 142.

Embodiment 3

Figure 10:
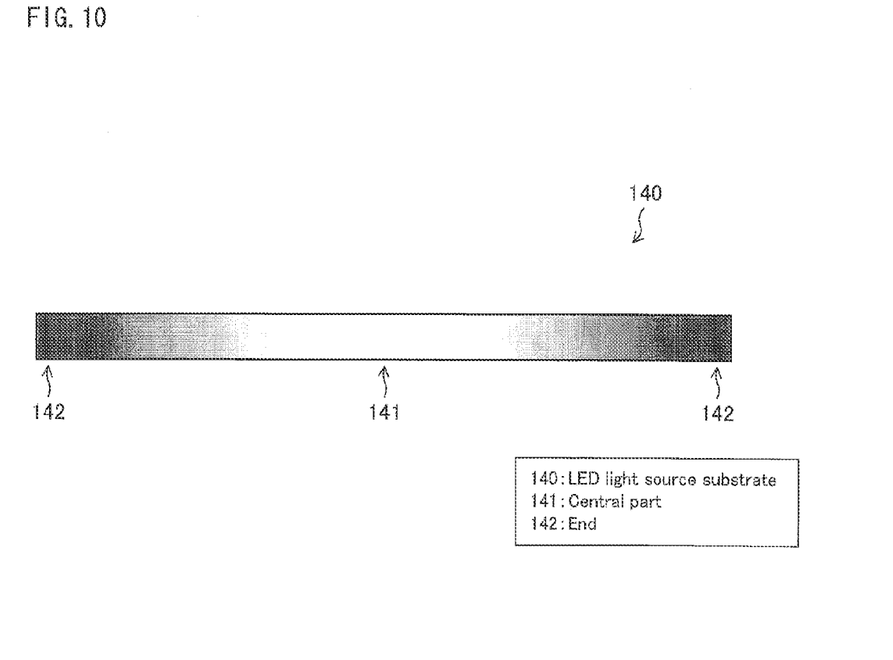
FIG. 10 is a side view showing light emitted from LED light source substrates in a surface light source device according to another embodiment of the present invention.

Next, another embodiment of the present invention is described with reference to FIGS. 10 through 12. FIG. 10 is a diagram showing light emitted from an LED light source substrate 140 in a surface light source device 10 of the present embodiment. As shown in the drawings, linear light from the LED light source substrate 140 of the present embodiment shift in chromaticity toward blue as the LED light source substrate 140 extends from the central part 141 toward each of the ends 142.

In this case, a difference in color between light from the central part 141 and the blue-shift light from the ends 142 is inconspicuous. Therefore, a difference in color of light emitted from the light guide plate 120 becomes further inconspicuous.

(Example of LED Light Source Substrate)

Next, a specific example of the LED light source substrate 140 of the present embodiment is described with reference to FIGS. 11 and 12.

Figure 11:
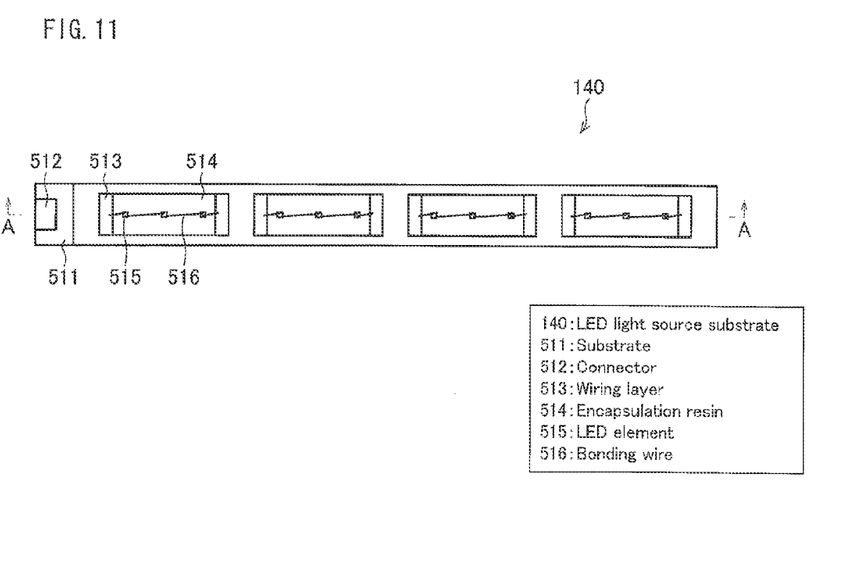
FIG. 11 is a side view schematically showing an LED light source substrate of the present example.
Figure 12:
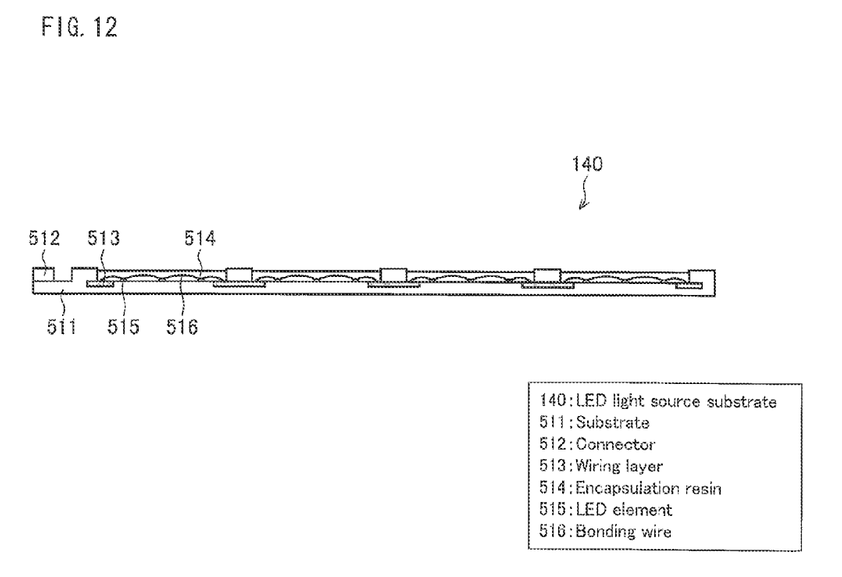
FIG. 12 is a cross-sectional view of the LED light source substrate as taken along the line A-A in FIG. 11.

FIG. 11 is a side view schematically showing the LED light source substrate 140 of the present example. FIG. 12 is a cross-sectional view of the LED light source substrate 140 as taken along the line A-A in FIG. 11. In the LED light source substrate 140 shown in FIGS. 11 and 12, LED elements (point light sources) 515 are mounted on a substrate 511 with COB (chip-on-board) technology without using an LED package. That is, the LED elements 515 are mounted directly on the substrate 511. The substrate 511 may include another layer (e.g. a wiring layer 513) as its surface, and in this case, the LED elements 515 may be mounted on the surface of that another layer. In either case, COB technology allows the LED elements 515 to be mounted as they are, instead of being mounted indirectly on the wiring substrate after being put in packages.

The substrate 511 has a surface (in FIG. 12, an uppermost surface of the substrate 11 that is drawn horizontally) and recesses that are lower than the surface, and the LED elements 515 are mounted in the recesses, respectively.

In the LED light source substrate 140, the wiring layer 513 and each of the LED elements 515 are electrically connected to each other via a bonding wire 516. Further, although not particularly illustrated, the wiring layer 513 is electrically connected to an electrode terminal of the connector 512. This configuration makes it possible to control light emission of the LED element 515 by electrically controlling a harness (not illustrated) connected to the connector 512.

The LED element 515, the bonding wire 516, and a site where they are connected to each other may be easily damaged by shock. This is prevented by an encapsulation resin 514 encapsulating the LED element 515 and the bonding wire 516 as well as the part where they are connected to each other. That is, the recesses are filled with the encapsulation resin 514. This configuration allows the LED element 515 and the bonding wire 516 to be protected from moisture, foreign matter, and the like in addition to being able to withstand a certain degree of shock applied from outside.

Further, the addition of a colorant and/or a phosphor to the encapsulation resin 514 makes it possible to adjust the tone of light that is emitted by the LED light source substrate 140. For example, when the LED elements 515 emit blue light or ultraviolet rays and the encapsulation resin 514 contain a conforming phosphor, the LED light source substrate 140 can emit white light.

Therefore, the LED light source substrate 140 of the present example can be achieved by causing at least either the light emission color (wavelength) of the LED elements 515 and the phosphor in the encapsulation resin 514 to shift in chromaticity from white toward blue as the LED light source substrate 140 extends from the central part 141 toward each of the ends 142.

When the LED light source substrate 140 is constituted by using LED packages and a wiring substrate as shown in FIGS. 5 and 6, there are such advantages as follows: The LED light source substrate 140 can be easily made comparatively large in size because its outer shape can be formed by press working or router working; The LED packages can be mounted with a common mounter; and the like. On the other hand, a method of mounting LED elements with COB technology as shown in FIGS. 11 and 12 brings about such advantages as follows: Since there is no need to use solder for mounting, there are no restrictions on temperature due to solder temperature during use; When the LED light source substrate 140 is small is size, it can be fabricated at low cost, as it is fabricated in into its final from in the same step as that which the LED packages are fabricated; and the like.

[Supplementary Explanation]

In each of the embodiments described above, an LED light source substrate 140 is used as a light source. However, this does not imply any limitation. As exemplified in each of the embodiments described above, the use of an LED light source substrate 140 as a light source makes it possible to achieve the same level of luminance with a shorter light source substrate.

In particular, the use of an LED light source substrate 140 as a light source makes it possible to easily adjust the luminance of a given part of the light guide plate 120 and the difference in color by adjusting the number and placement (positions and intervals) of LED elements. For example, for higher luminance at an end of a short side of the light guide plate 120, this adjustment can be easily achieved by shortening the intervals at which the LED elements are placed at the end.

[Addition]

The present invention is not limited to the description of the embodiments above, but may be altered by a skilled person in the art within the scope of the claims. An embodiment based on a proper combination of technical means disclosed in different embodiments is encompassed in the technical scope of the present invention. Furthermore, the technical means disclosed in different embodiments can be combined to form a new technical feature.

For example, while, in each of the embodiments described above, light from an end of each LED light source substrate 140 is the blue-shift light, linear light from the LED light source substrate 140 may be changed to linear light having nonuniform chromaticity. In this case, a side surface of the light guide plate 120 is irradiated with linear light having nonuniform chromaticity from the LED light source substrate 140; therefore, surface light having nonuniform chromaticity is emitted from the light guide plate 120. This makes less conspicuous a difference in color that occurs at a boundary between the main part of the light guide plate 120 and a corner of the light guide plate 120.

[Summary]

An edge-light type surface light source device according to one aspect of the present invention includes: linear light sources; and a light guide section for emitting surface light when linear light from the linear light sources is incident on the light guide section, the linear light sources being disposed with the light guide section interposed therebetween, each of the linear light sources being shorter in length than a plane of incidence of the light guide section, the linear light sources being configured such that the liner light has nonuniform chromaticity.

According to the foregoing configuration, the light guide section is irradiated with linear light having nonuniform chromaticity from the linear light sources, surface light having nonuniform chromaticity is emitted from the light guide section. This makes less conspicuous a difference in color of emitted light that occurs at a boundary between a main part of the light guide section and a corner of the light guide section.

In the edge-light type surface light source device according to one aspect of the present invention, each of the linear light sources is preferably configured such that the chromaticity of the linear light is uniform in a central part thereof and shifts toward blue at least one end thereof in comparison with the central part.

According to the configuration described above, the linear light with which the light guide section is irradiated from each of the linear light sources is uniform in chromaticity in the central part and is more shifted in chromaticity toward blue at least one end than in the central part. This causes more of the light emitted from the main part of the light guide section to be from the central parts of the two linear light sources, and causes less of the light to be from the other parts. Therefore, light having uniform chromaticity is emitted from the main part of the light guide section.

Meanwhile, light emitted from the corners of the light guide section is light from the linear light source which, of the two linear light sources, is farther from the corners. Therefore, more of the light emitted from each of the corners is from the end which, of the two ends of the linear light source, is closer to the corners, and less of the light is from the other parts. It should be noted here that in a case where the light from the ends is light more shifted in chromaticity toward blue than the light from the central part, the light, while traveling through the light guide section, has its short-wavelength component such as blue more absorbed than its long-wavelength component such as red. As a result, the light emitted from the corners has its blue shift canceled out and becomes equal in chromaticity to that emitted from the central part.

Therefore, since a difference in color of emitted light that occurs at a boundary between the main part of the light guide section and each of the corners of the light guide section is reduced, the difference in color becomes less inconspicuous. In a case where the two linear light sources are disposed opposite the central part of the plane of incidence of the light guide section, it is preferable that each of the linear light sources be configured such that the chromaticity of light from both of the ends is more shifted toward blue than the chromaticity of light from the central part.

It is preferable that each of the linear light sources be configured such that a difference in color between the light from the central part and the light from the ends that is shifted toward blue is inconspicuous.

Therefore, in the edge-light type surface light source device according to one aspect of the present invention, each of the linear light sources may be configured such that the chromaticity of the linear light shifts toward blue as the linear light source extends from the central part toward at least one end.

Further, the edge-light type surface light source device according to one aspect of the present invention may be configured such that: each of the linear light sources is a linear arrangement of a plurality of point light sources; the point light sources include white light sources that emit white light and shift light sources that emits light obtained by shifting the white light toward blue; and a proportion of the shift light sources that are arranged becomes higher as the linear light source extends from the central part toward at least one end.

Further, the edge-light type surface light source device according to one aspect of the present invention may be configured such that each of the linear light sources causes light from a linear arrangement of a plurality of LED elements to be emitted through a phosphor. In this case, each of the linear light sources can emit lights of different chromaticities at least either by including types of the LED elements that emit lights of different wavelengths or by including different types of the phosphor.

In the edge-light type surface light source device according to one aspect of the present invention, each of the linear light sources may include a substrate and a plurality of LEDs mounted thereon with COB technology.

It should be noted effects similar to those mentioned above can be brought about by a liquid crystal display device including: a liquid crystal panel; and a surface light source device serving as a backlight for the liquid crystal panel, the surface light source device being an edge-light type surface light source device of any one of the configurations described above.

INDUSTRIAL APPLICABILITY

The present invention is applicable to various types of surface light source devices such as illuminating surface light source devices as well as surface light source devices serving as backlights for liquid crystal display devices.

REFERENCE SIGNS LIST

10 Surface light source device (edge-light type surface light source device)
120 Light guide plate (light guide section)
121a, 121b Short side (plane of incidence)
122a, 122b Long side
130 Reflecting sheet
140a, 140b LED light source substrate (linear light source)
141 Central part
142 End
150 Diffusing sheet
160 Housing
210a, 210b Corners
511 Substrate
512 Connector
513 Wiring layer
514 Encapsulation resin (phosphor)
515 LED element (point light source)
516 Bonding wire
601 Connector
610 Wiring substrate
611 Substrate
612 Wiring layer
613 Solder resist layer
620 LED package (point light source)
620a LED package that emits white light (white light source)
620b LED package that emits blue-shift light (shift light source)
621 LED element
622 Encapsulation resin (phosphor)
623 Bonding wire
624 Wiring layer
625 Substrate
626 Solder

The invention claimed is:

1. An edge-light type surface light source device comprising:
   linear light sources; and
   a light guide section for emitting surface light when linear light from the linear light sources is incident on the light guide section,
   the linear light sources being disposed with the light guide section interposed therebetween,
   each of the linear light sources being shorter in length than a plane of incidence of the light guide section,
   the linear light sources being configured such that the liner light has nonuniform chromaticity.

2. The edge-light type surface light source device as set forth in claim 1, wherein each of the linear light sources is configured such that the chromaticity of the linear light is uniform in a central part thereof and shifts toward blue at least one end thereof in comparison with the central part.

3. The edge-light type surface light source device as set forth in claim 2, wherein each of the linear light sources is configured such that the chromaticity of the linear light shifts toward blue as the linear light source extends from the central part toward at least one end.

4. The edge-light type surface light source device as set forth in claim 2, wherein:
   each of the linear light sources is a linear arrangement of a plurality of point light sources;
   the point light sources include white light sources that emit white light and shift light sources that emit light obtained by shifting the white light toward blue; and
   a proportion of the shift light sources that are arranged becomes higher as the linear light source extends from the central part toward at least one end.

5. The edge-light type surface light source device as set forth in claim 1, wherein each of the linear light sources causes light from a linear arrangement of a plurality of LED elements to be emitted through a phosphor.

6. The edge-light type surface light source device as set forth in claim 5, wherein each of the linear light sources emits lights of different chromaticities at least either by including types of the LED elements that emit lights of different wavelengths or by including different types of the phosphor.

7. The edge-light type surface light source device as set forth in claim 1, wherein each of the linear light sources includes a substrate and a plurality of LEDs mounted thereon with COB technology.

8. A liquid crystal display device comprising:
   a liquid crystal panel; and
   a surface light source device serving as a backlight for the liquid crystal panel,
   the surface light source device being an edge-light type surface light source device as set forth in claim 1.

* * * * *